Figures 1, 2:
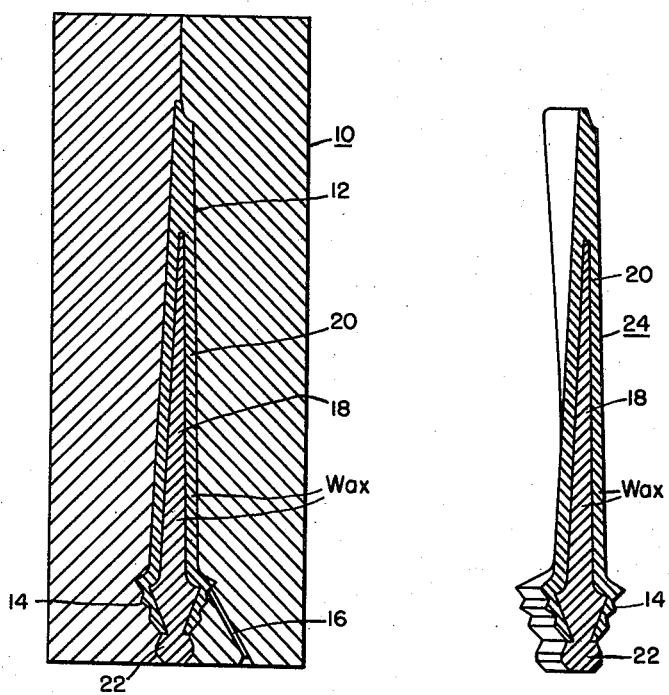

INVENTORS
Paul S. McFadden &
Warren L. Marshall.

Patented Oct. 12, 1954

2,691,197

UNITED STATES PATENT OFFICE 2,691,197

PROCESS OF MAKING WAX PATTERNS

Paul S. McFadden, Irwin, and Warren L. Marshall, Pittsburgh, Pa., assignors to Westinghouse Electric Corporation, East Pittsburgh, Pa., a corporation of Pennsylvania Application June 21, 1951, Serial No. 232,736

2 Claims. (Cl. 22—195)

This invention relates to the making of wax patterns for use in precision casting.

In practicing precision casting, it has been the custom to make wax patterns of the article to be produced, invest the pattern in a suitable investment material and thereafter to melt the wax pattern from the investment material to leave a casting mold for receiving molten metal. Where the article to be produced is small, there has been no particular problem in producing the wax patterns. However, where the article is large, the shrinkage of the wax pattern as the wax cools in the injection mold or die presents a difficult problem, making it substantially impossible to hold rigid dimensional tolerances.

Recently there has been developed a process of employing a steel core in a die cavity having the configuration of the article to be produced so as to reduce the amount of wax used in forming the pattern and thereby attempt to control or limit the shrinkage of the wax forming the pattern. In such a process, after the wax was injected about the steel core in the die cavity and solidified, the steel core was removed from the wax pattern necessitating a manual sealing of the opening left therein by withdrawing the steel core.

Such a process of making the wax patterns has not proven to be satisfactory for a number of reasons. The steel core must be relatively straight with a slight taper to permit stripping of the core from the wax pattern. Each core member must be mounted on a base block with the result that they are not always identically mounted and the patterns formed are not identical as to wall thickness and the like. Further, when a steel core is removed from the wax pattern the void or cavity left by the removal of the steel core permits collapse of the pattern and in all cases such voids must be manually sealed before the patterns can be used.

An object of this invention is to provide a process of making a substantially solid wax pattern of relatively large size having rigid dimensional tolerances.

Other objects of this invention will become apparent from the following description when taken in conjunction with the accompanying drawing, in which:

Figure 1 is a view in section of a die having a wax pattern formed therein in accordance with the teachings of this invention; and Fig. 2 is a view in section of a wax pattern of the turbine blade formed by the process of this invention.

Referring to the drawing, this invention is illustrated by reference to the making of a wax pattern of a turbine blade. In practicing the invention, a split mold or die 10 is formed having a die cavity 12 therein of the configuration and size of the article, in this case a turbine blade, which is to be produced. In the case of a turbine blade, the die cavity 12 is formed with a root section 14 corresponding to the root section of the turbine blade to be produced. The die 10 is also provided with a gate 16 located at any convenient point and in the example illustrated the gate 16 is illustrated as supplying the root section 14 of the cavity 12.

In accordance with this invention, a core member 18 is first formed of wax. A wax composition suitable for making the core member and the resulting wax pattern is that disclosed and claimed in Patent 2,467,796 issued April 19, 1949, to H. B. Willis and assigned to the assignee of this invention. The core member 18 may be formed in any suitable manner, one mode being that disclosed in Patent 2,434,557 issued January 13, 1948, to Fox et al. and assigned to the assignee of this invention. In practice, the core member 18 preferably has substantially the same configuration as the final wax pattern which is to be produced although the core member 18 is much smaller in size. Thus the core member 18 may be said to constitute a miniature of the wax pattern which is to be finally produced.

As illustrated in the example shown in the drawing, the core member 18 is provided with substantially the configuration of the die cavity 12, but is much smaller so as to provide a space 20 between the core member and the walls of the die cavity 12 when the core member 18 is inserted therein, which space 20 is substantially uniform throughout the die cavity 12. In practice, the core member 18 is preferably formed with a base portion 22 which corresponds to a part of the final root section of the pattern to be formed and a part of the root section 14 of the cavity 12 formed in the die 10. By forming the core member 18 of wax in this manner, the core member can be readily positioned in the die 10 as the root portion 22 of the core member 18 fits into the corresponding portion of the root section 14 of the cavity 12 effectively sealing the cavity and maintaining the core member 18 in position spaced from the walls of the die cavity 12.

With the core member 18 positioned in this manner in the die cavity 12, additional wax is injected into the die cavity through the gate 16 in any suitable manner and preferably in the manner disclosed in the Fox et al. Patent 2,434,557 referred to hereinbefore. Thus the additional wax injected into the die cavity 12 is in a plastic condition having a temperature ranging from between 55° C. and 70° C. whereby when injected under pressure into the die cavity, the plastic wax flows smoothly and freely into the cavity 12 without excessive turbulence to flow about the wax core member 18 and completely fill the space 20 between the core member 18 and the confines of the die cavity 12. It is thus seen that the plastic wax also completely fills the remaining portion of the root section 14 of the cavity 12 and interlocks with the base portion of the core member 18 and since the core member 18 has substantially the same configuration as the single wax pattern, that is, it is provided with curved surfaces, the injected wax flows about the curved surfaces to effect interlocking of the injected wax with the core mold 18.

When the die cavity 12 is thus filled, the injected wax is cooled and solidified in interlocked relation with the core member 18 so that a substantially solid wax pattern 24, as shown in Fig. 2, results. In practice, the temperature drop in the mold or die 10 is usually sufficient to effect the cooling of the injected plastic wax when the cavity is filled so that the injected wax will solidify in position about the core member 18. Where desired, forced cooling of the die 10 may be effected to accelerate the cooling of the injected wax although this is not usually necessary.

After the cavity 12 is thus filled and the injected wax is solidified in interlocked relation with the core member 18, the die 10 is removed from the injecting apparatus, for example, that shown in the Fox et al. Patent 2,434,557, and the die is opened and the wax pattern 24 removed therefrom. The resulting pattern 24 is a duplication of the mold cavity 12 and since only a portion of the wax of the final pattern 24 has been injected into the mold, it is found that variation in the shrinkage of the wax upon cooling is substantially eliminated, the dimensional tolerances of the die cavity being maintained in the resulting pattern. Since the wax injected into the die cavity 12 is in the plastic condition, no melting or distortion of the wax core member 18 is found and in fact if the final wax pattern 24 is broken, it is quite evident that the core member retains its true identity in the final product as there is no adherence due to melting between the core member 18 and the injected wax.

As is quite evident, the wax pattern 24 thus produced needs no further manual treatment other than to mount it for assembly in a flask for investing the pattern with a refractory investment material. The fact that a wax core is utilized provides for uniformity of the resulting wax pattern since the entire pattern is formed of wax. Further, since the wax core members can be made from a single master pattern, the wax core members are uniform in shape and size, making it possible to duplicate the positioning of the wax patterns in the die cavity in the making of the final wax pattern. The size and shape of the core member 18 will, of course, depend somewhat on the final wax pattern to be produced although it is desired in all cases to provide the core member with a non-uniform base portion to facilitate interlocking of the injected plastic wax with the core member. Preferably, the core member also is provided of substantially the same configuration as the final wax pattern so that a substantially uniform spacing may be obtained between the surfaces of the core member and the die cavity in which the core member is mounted.

By forming the wax pattern 24 in the manner described hereinbefore, it is evident that distortion of the wax pattern during stripping of the pattern from the die member is substantially eliminated since the wax pattern is a solid wax member. Further distortion of the wax pattern, such as was encountered where a steel core member has been utilized, has been completely eliminated since it is no longer necessary to strip the core member from the final wax pattern. Likewise, since it is no longer necessary to remove the core member from the final wax pattern 24, such wax pattern is completely free of voids so that the danger of collapse of the wax pattern during handling or investing procedures is also eliminated. Considerable savings are effected by the process of this invention as such process also eliminates manual handling of the final wax pattern for sealing the voids such as was necessary in the prior art processes.

It will, of course, be appreciated that while reference has been made to one type of wax composition, other wax compositions may be employed in practicing the process of this invention. Likewise, different apparatus may be utilized for forming the core member 18 and for injecting the plastic wax into the die cavity of the die 10. However, regardless of the type of wax or the apparatus utilized for effecting the ejection of the plastic wax, it is quite apparent that the process of this invention is highly efficient and makes possible the production of large quantities of wax patterns with very few rejects while at the same time effecting economies in the production of the wax patterns.

We claim as our invention:

1. In the process of making a wax pattern to be used in precision casting, the combination of steps comprising making from a given wax composition an initial core member of predetermined shape smaller than but of matching configuration to the desired pattern, placing the core member within a hollow die having walls forming a cavity corresponding to precisely the desired pattern, one end of the core member fitting tightly against the walls of the hollow die whereby to hold the core member in position and the remainder of the core member is spaced from the walls of the die so that there is a relatively small space between the core member and the walls of the die, injecting an additional amount of the same wax composition to fill the space between the core member and the die walls, the additional wax flowing about the core member as it is injected to bond thereto and to cooperate therewith to produce a substantially solid pattern having the precise configuration of the die cavity, withdrawing the pattern from the die, investing the pattern in a refractory and then heating the invested pattern to melt out all the wax composition thereby leaving a cavity in the investment corresponding to the wax pattern.

2. In the process of making a precision casting of a blade having a root section, the combination of steps comprising making an initial core member of a given wax composition, the core member being smaller than the desired blade, but having a root section substantially of the desired final shape, positioning the core member in a die having walls forming a cavity corresponding to the exact desired blade shape, the root section engaging with the corresponding portion of the die walls to hold the core member in position so that a small space is present between the rest of the core member and the die walls, injecting an additional amount of the same wax composition into the die cavity to flow about and to bond with the core member and to fill the die, cooling the wax composition, withdrawing the resulting wax pattern from the die, investing the wax pattern in a refractory, and then heating the invested pattern to melt out all the wax composition thereby leaving a blade cavity in the investment corresponding to the configuration of the die cavity.

References Cited in the file of this patent

UNITED STATES PATENTS

| Number | Name | Date |
|---|---|---|
| 1,313,907 | Petry | Aug. 26, 1919 |
| 1,675,732 | Schweitzer | July 3, 1928 |
| 2,136,404 | Wheeler | Nov. 15, 1938 |
| 2,420,851 | Zahn et al. | May 20, 1947 |
| 2,532,280 | Atkinson | Dec. 5, 1950 |